US011822817B2

(12) United States Patent
Smith (10) Patent No.: US 11,822,817 B2
(45) Date of Patent: Nov. 21, 2023

(54) ORDERING READS TO LIMIT COLLISIONS IN A NON-VOLATILE MEMORY (NVM)

(71) Applicant: Seagate Technology LLC, Fremont, CA (US)

(72) Inventor: Christopher Smith, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 134 days.

(21) Appl. No.: 17/443,554

(22) Filed: Jul. 27, 2021

(65) Prior Publication Data

US 2022/0035569 A1 Feb. 3, 2022

Related U.S. Application Data

(60) Provisional application No. 62/706,089, filed on Jul. 31, 2020.

(51) Int. Cl.
*G06F 3/06* (2006.01)
*G06F 12/0875* (2016.01)
*G06F 12/0804* (2016.01)

(52) U.S. Cl.
CPC .......... *G06F 3/0659* (2013.01); *G06F 3/0611* (2013.01); *G06F 3/0679* (2013.01); *G06F 12/0804* (2013.01); *G06F 12/0875* (2013.01); G06F 2212/1024 (2013.01); G06F 2212/2022 (2013.01)

(58) Field of Classification Search
None
See application file for complete search history.

(56) References Cited

U.S. PATENT DOCUMENTS

| 4,750,112 | A | 6/1988 | Jones et al. |
| 5,895,485 | A * | 4/1999 | Loechel ............... G06F 12/0804 |
| | | | 711/119 |
| 7,978,516 | B2 | 7/2011 | Olbrich et al. |
| 8,228,701 | B2 | 7/2012 | Sokolov et al. |
| 10,528,464 | B2 | 1/2020 | Ishiyama et al. |
| 2013/0185475 | A1* | 7/2013 | Talagala ............... G06F 12/0866 |
| | | | 711/102 |
| 2016/0299724 | A1* | 10/2016 | Vanaraj ................. G06F 3/0616 |
| 2019/0212934 | A1* | 7/2019 | Chopra ................. G06F 3/0683 |
| 2020/0394133 | A1* | 12/2020 | Carpenter ............. G06F 3/0608 |
| 2022/0100425 | A1* | 3/2022 | Ryu ....................... G06F 3/0611 |

* cited by examiner

*Primary Examiner* — William E. Baughman
(74) *Attorney, Agent, or Firm* — Hall Estill Law Firm; Randall K. McCarthy (57) ABSTRACT

Method and apparatus for managing data in a storage device, such as a solid-state drive (SSD). In some embodiments, a data storage device includes a main non-volatile memory (NVM), a host command queue that lists pending host read and host write commands, and a write cache which temporarily stores write data sets pending transfer to the NVM responsive to execution of the associated host write commands in the host command queue. A collision prediction circuit predicts a rate of future collisions involving the cached write data sets. A storage manager directs storage of the write data sets to a first target location responsive to the rate of future collisions being at a first level, and directs storage of the write data sets to a different, second target location responsive to the rate of future collisions being at a different, second level.

20 Claims, 5 Drawing Sheets

ORDERING READS TO LIMIT COLLISIONS IN A NON-VOLATILE MEMORY (NVM)

RELATED APPLICATION

The present application makes a claim of domestic priority to U.S. Provisional Application No. 62/706,089 filed Jul. 31, 2020, the contents of which are hereby incorporated by reference.

SUMMARY

Various embodiments of the present disclosure are generally directed to a method and apparatus for enhancing performance of a storage device, such as a solid-state drive (SSD).

In some embodiments, an apparatus includes a main non-volatile memory (NVM), a host command queue that lists pending host read and host write commands, and a write cache which temporarily stores write data sets pending transfer to the NVM responsive to execution of the associated host write commands in the host command queue. A collision prediction circuit predicts a rate of future collisions involving the cached write data sets. A storage manager directs storage of the write data sets to a first target location responsive to the rate of future collisions being at a first level, and directs storage of the write data sets to a different, second target location responsive to the rate of future collisions being at a different, second level.

These and other features and advantages which characterize the various embodiments of the present disclosure can be understood in view of the following detailed discussion and the accompanying drawings.

DETAILED DESCRIPTION

The present disclosure generally relates to the management of data transfer commands in a data storage device, such as but not limited to a solid-state drive (SSD).

Storage devices generally include a controller and a non-volatile memory (NVM). The controller communicates with a host (client) device to direct the storage of user data from the client device to the NVM, and to retrieve and transfer the user data from the NVM to the client device.

Solid-state drives (SSDs) are a popular form of storage device commonly used in current generation storage systems. SSDs use solid-state semiconductor memory, such as NAND flash, as the NVM. A flash memory is usually arranged as a number of flash semiconductor dies that are accessible via channels (lanes).

Data sets are often distributed across the various dies to allow parallel processing of client access commands (e.g., read commands, write commands, etc.). Background operations are carried out to enable the SSD to service the client access commands at acceptable performance rates. Background commands can include garbage collection, map updates, calibration operations, etc. Client read commands are usually given priority over client write commands and background commands.

Collisions refer to situations where multiple commands require the same resources within the SSD in order to be executed, and so the commands cannot be carried out at the same time. Normally, one command can be selected for execution, but the remaining command(s) need to wait until the necessary resource(s) become available before these can be subsequently executed in turn. In some cases, a group of different types of commands need to be carried out in a particular order along a critical path, such as the retrieval of map metadata before a read or programming operation can be carried out, the reading out and buffering of current version data from a selected garbage collection unit (GCU) prior to erasure, etc.

Collision arbitration may be carried out at an SSD controller or flash memory electronics (FME) level, but usually, some sort of round robin or FIFO approach is used to select among the respective pending commands to arrive at an optimum execution order. Host reads are usually given priority since the other forms of commands can be carried out in the background without necessarily directly impacting host performance. However, it is important to continue to execute the background commands at a regular rate to maintain overall host I/O performance at an acceptable level. This can be particularly true in periods of IOD (deterministic performance per the NVMe specification). A problem thus arises when large numbers of collisions between commands are occurring, particularly with respect to competing host reads.

Various embodiments of the present disclosure are generally directed to predicting the occurrence of future read collisions involving an NVM, and to select target locations for the storage of write data in the NVM to reduce the potential occurrence of such collisions.

The prediction of future collisions can be based on a number of factors, including the identification of hot areas within the SSD that are being accessed frequently, as well as the number of previous collisions that have recently occurred. A monitor function of an SSD controller can be used for this purpose. Predictions can also be made based on pending host command queues, recent read history, etc.

In response, the controller selects target locations for the storage of new write data sets based on the predicted occurrence rate of future collisions. This may include reallocating die sets or other memory areas, such as different GCUs, to distribute the data. The distribution operation can be adaptively switched in if the predicted number of future collisions reaches a predetermined threshold. Collisions can continue to be monitored and further data distributions can take place until the number or rate of predicted/measured collisions is reduced to an acceptable level. In this way, collisions can be avoided by proactively selecting new locations for the storage of the data before the collisions occur.

Figure 1:
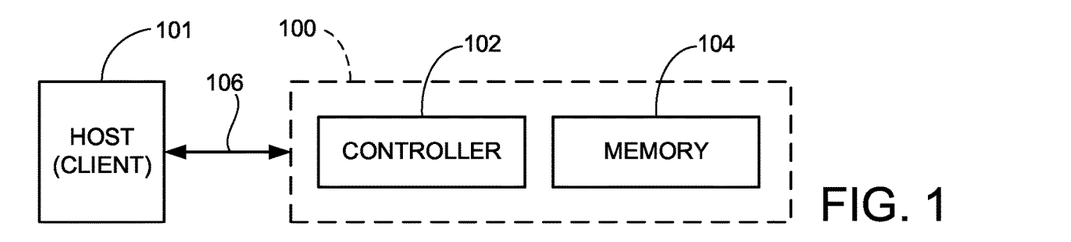
FIG. 1 provides a functional block representation of a data storage device constructed and operated in accordance with various embodiments of the present disclosure.

These and other features and advantages of various embodiments can be understood beginning with a review of FIG. 1 which provides a functional block representation of a data storage device 100. The storage device 100 is coupled to a host (client) device 101.

The storage device 100 includes a controller 102 and a memory 104. The controller 102 provides top-level control of the memory 104 and processes communications with the client 101. The memory 104 provides non-volatile memory (NVM) for the storage of user data from the client. The controller 102 is an electrical circuit that may take the form of a programmable CPU processor that operates in conjunction with programming stored in a computer memory within the device. The controller may alternatively be a hardware based circuit, or may incorporate both programmable and hardware circuit aspects. Commands and data are transferred between the client device 101 and the storage device 100 using a suitable host interface 106.

Figure 2:
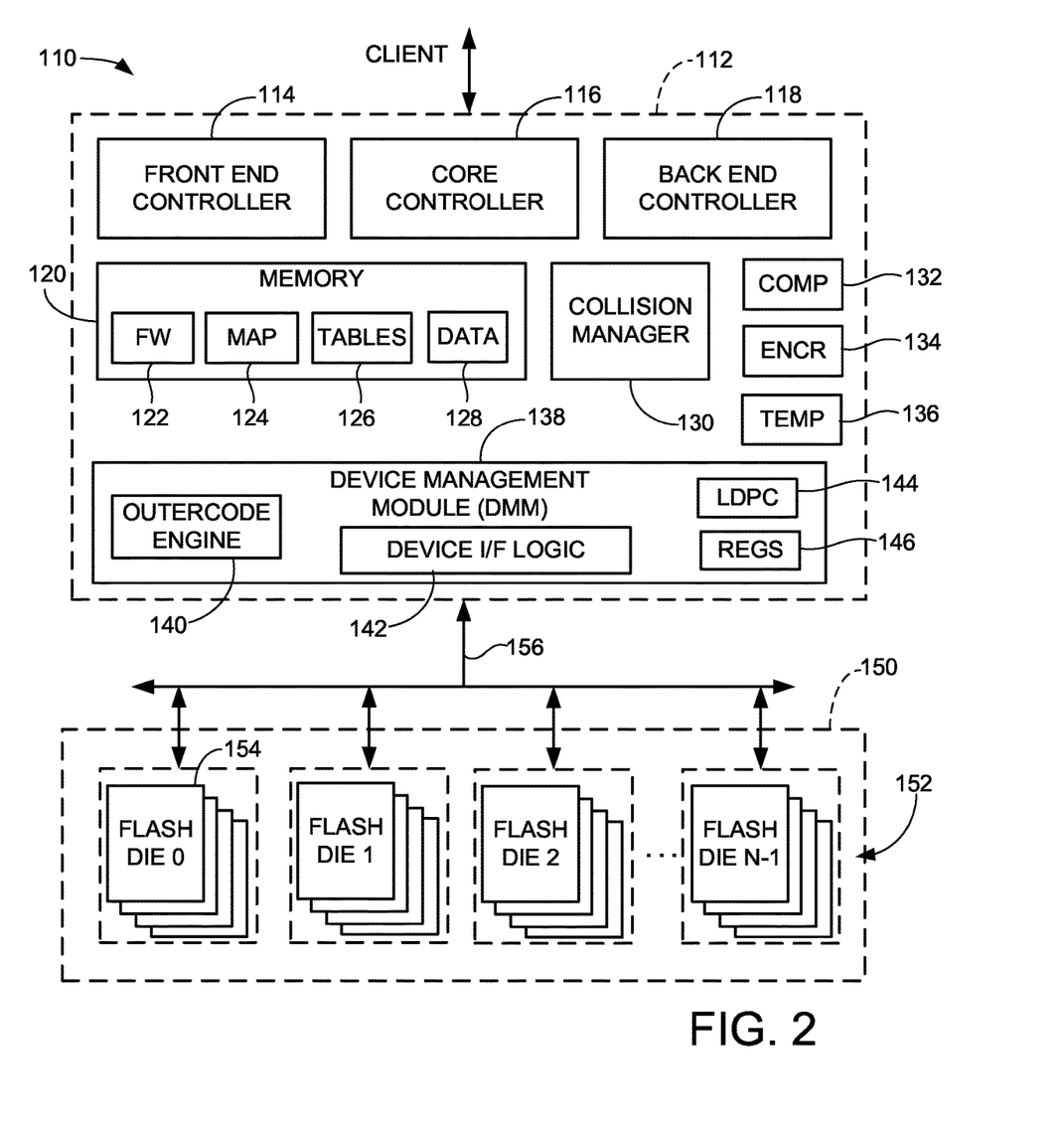
FIG. 2 illustrates the device of FIG. 1 characterized as a solid-state drive (SSD) in accordance with some embodiments.

FIG. 2 describes relevant aspects of an exemplary data storage device 110 corresponding to the device 100 of FIG. 1. The device 110 is a solid-state drive (SSD) that communicates with one or more client devices via one or more Peripheral Component interface Express (PCIe) ports. The NVM comprises 3D NAND flash memory, although other forms of memory can be used.

In at least some embodiments, the SSD 110 operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner).

The SSD 110 includes a controller circuit 112 that corresponds to the controller 102 in FIG. 1. The controller circuit 112 has a front end controller 114, a core controller 116 and a back end controller 118. The front end controller 114 performs host I/F functions, the back end controller 118 directs data transfers with the memory module and the core controller 116 provides top level control for the device.

Each controller 114, 116 and 118 includes a separate programmable processor with associated programming (e.g., firmware, FW) in a suitable memory location, as well as various hardware elements to execute data management and transfer functions. Alternatively, some or all of the controllers 114, 116 and 118 may be realized using a single processor. A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers. The map data 124 may take the form of a flash transition layer (FTL) to identify physical locations at which logically addressed blocks of user data are stored.

A collision manager circuit 130 is incorporated into the controller 112 using hardware and/or firmware. As explained below, the collision manager 130 manages collisions among commands issued by the client 101 to service client commands and/or internal commands issued by the core controller 116 or other aspects of the SSD.

Continuing with FIG. 2, the controller 112 can include further features such as a data compression (COMP) block 132 which applies lossless data compression to input data sets during write operations to enhance storage efficiency. An encryption (ENCR) block 134 applies cryptographic processing such as encryption/decryption to provide data security for the SSD. A temperature (TEMP) block 136 uses one or more temperature sensors to monitor and record temperatures of the SSD during operation.

A device management module (DMM) 138 supports back end processing operations of the SSD. The DMM 138 includes an outer code engine circuit 140 to generate outer code, a device I/F logic circuit 142, and a low density parity check (LDPC) circuit 144 configured to generate and use LDPC codes as part of an error detection and correction strategy to protect the data stored by the SSD. A number of registers (REGS) 146 are provided to temporarily accumulate and store data during data transfer operations.

A memory module 150 is coupled to the controller 112 via the DMM 138. The memory module 150 corresponds to the memory 104 in FIG. 1, and includes a non-volatile memory (NVM) in the form of a flash memory 152 distributed across a plural number N of flash memory dies 154. Flash memory control electronics (not separately shown in FIG. 2) facilitate parallel data transfer operations via a plural number M channels (lanes) 156. In one embodiment, the flash memory 150 has 256 dies 154 (e.g., N=256) serviced by 8 channels 156 (e.g., M=8) so that 32 dies are coupled to each channel. Only one die can be accessed by each channel at a time, although up to eight dies can be accessed in parallel at a time using all eight channels. Other arrangements can be used.

While not limiting, modern SSDs and other data storage device systems are often formed from integrated memory modules such as 104, 150 that are commercially available from a source of such devices. The memory modules are integrated into an SSD by a device manufacturer which supplies the controller functions in a separate controller 102, 112. The controller may be a single integrated circuit such as in the case of a system on chip (SOC) design, or a grouping of integrated circuits.

In this arrangement, the controller and memory modules are separate operational entities which communicate across one or more internal command and data interfaces. A pull system is commonly used in which the controller issues commands to the memory, and then repetitively sends status inquiries to the memory to determine whether the commands have been completed.

Once the memory signals that a particular command has been completed, the controller may issue additional commands to the memory. For example, when the memory sends a command complete status for a read command, the controller may send a data transfer command to cause the memory to transfer the recovered data to the controller. While any number of different schemes can be employed to handle the interactions between the controller and the memory, it will be noted at this point that the various embodiments presented herein are particularly directed to improvements in the command and data exchanges between the controller and the memory.

Figure 3:
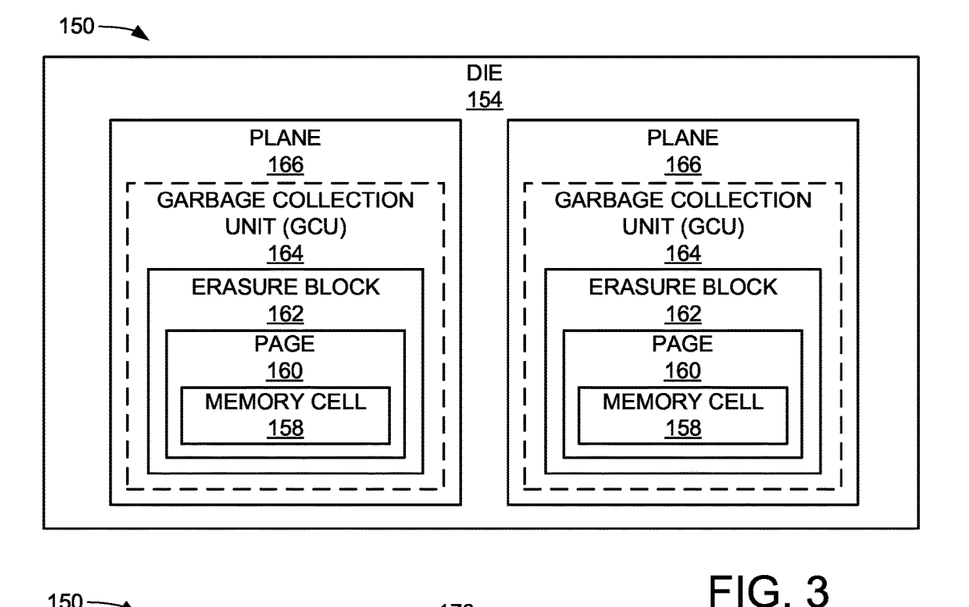
FIG. 3 shows a physical and logical layout of a flash die from FIG. 2 in some embodiments.

FIG. 3 shows a physical/logical arrangement of the various flash memory dies 154 in the flash memory module 150 of FIG. 2 in some embodiments. Each die 154 incorporates a large number of flash memory cells 158. The cells may be arrayed in a three-dimensional (3D stacked) arrangement with various control lines (e.g., source, bit, word lines) to access the cells.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), 4LCs (four-level cells with four bits per cell), and so on. Generally, n bits of data can be stored to a particular memory cell 158 using $2^n$ different charge states (e.g., TLCs use eight distinct charge levels to represent three bits of data, 4LCs use sixteen distinct charge levels to represent four bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle (garbage collect) the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies. The dies in a given GCU may be affixed to a single channel 156, or spread across multiple channels (see FIG. 2).

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
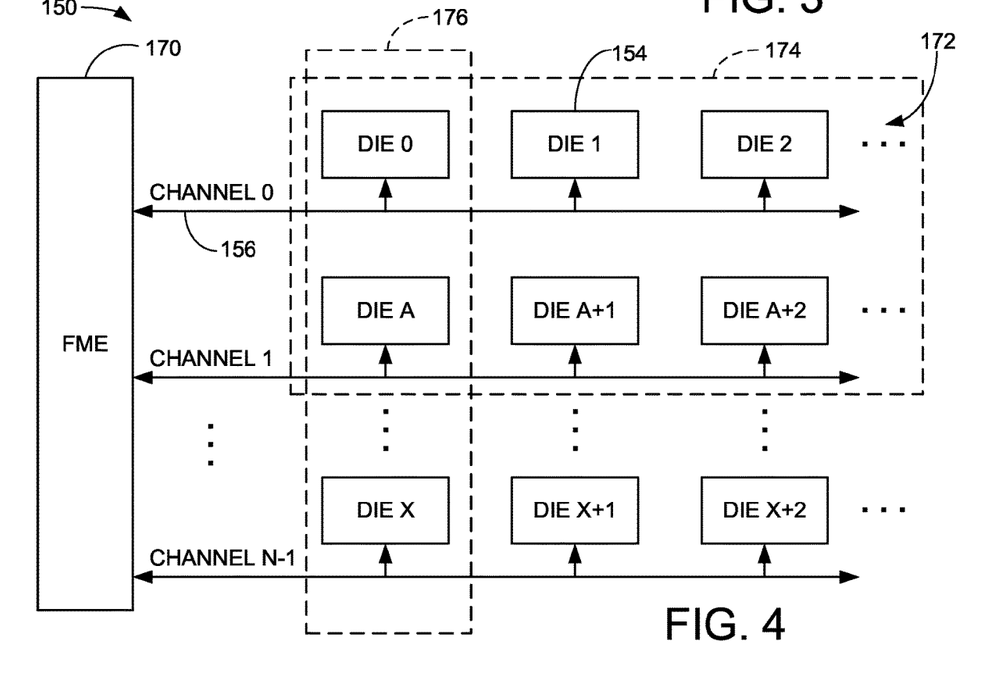
FIG. 4 illustrates an arrangement of the non-volatile memory (NVM) of FIG. 2 as different die sets in some embodiments.

FIG. 4 shows an arrangement of the flash memory dies 154 in conjunction with a flash memory electronics (FME) module 170 in further embodiments. The FME 170 may be divided among multiple processors that serve, collectively, as a front end for the flash memory module 150 (see FIG. 2). Groups of the dies 154 are connected to individual channels 156 to form die sets 172. Each die set 172 represents the dies 154 connected to an individual die. As noted above, one configuration provides a total of 256 dies interconnected using eight (8) channels so that each channel is connected to 32 dies. Other arrangements can be used. Only a single die can be accessed via the associated channel at a time. The dies 154 can be arranged into different groupings, such as a first grouping 174 which incorporates all of the dies affixed to the first two channels 156 (e.g., channels 0 and channel 1). In this case, the first grouping 174 constitutes the first 64 dies in the array.

A second die grouping is represented at 176. This represents a single die (8 in total) that are spread across all of the channels 156 (from channel 0 to channel N−1). Other die groupings can be made as desired. It will be appreciated that accessing die group 174 requires access to channels 0 and 1, while accessing die grouping 176 requires access to all of the channels (channels 0 through N−1). Different arrangements of the dies thus provides different access rates; if the dies are arranged into subgroups that use subsets of the available channels, then faster average I/O transfer rates can be obtained in parallel for multiple data sets; if the arrangements of the dies are provided across all the channels, then individual data sets across all the channels can provide faster I/O transfer rates but other transfers will need to wait until all of the channels are available, and so on.

Figure 5:
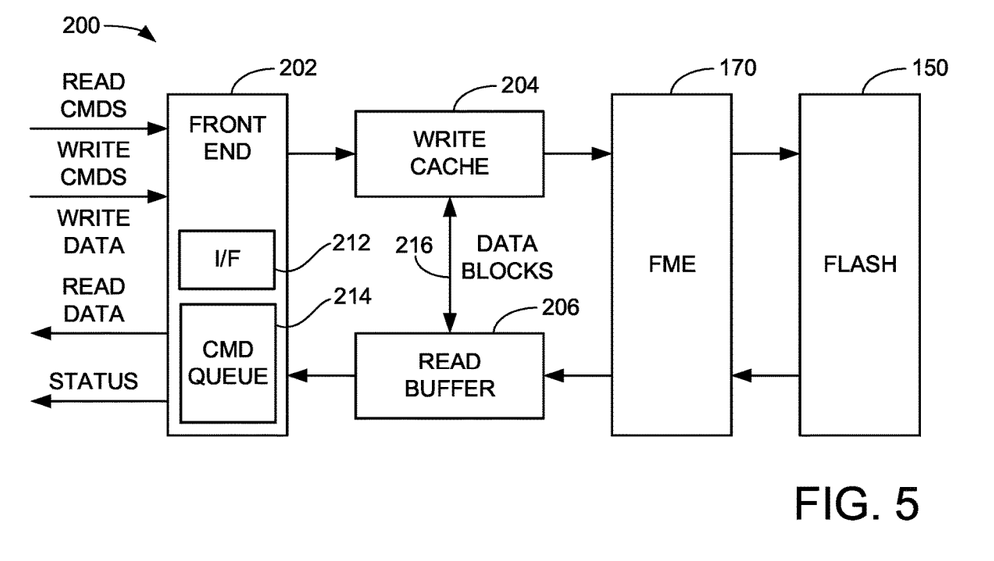
FIG. 5 depicts data paths through the SSD during the servicing of client access (read and write) commands in some embodiments.

FIG. 5 shows another aspect of the SSD 110 of FIG. 2, with regard to data transfer circuitry 200. The circuitry 200 of the SSD 110 includes a front end 202, a write cache 204, and a read buffer 206. These elements interface with the flash memory electronics (FME) 170 and the flash memory module 150.

The front end 202 interfaces with one or more client devices 101 (FIG. 1) using an interface (I/F) circuit 212. Pending access commands, either from the client device or internally generated, are stored in one or more command queues 214.

During normal operation of the SSD 110, the client(s) will issue various access commands including read and write commands. Each client read command will constitute a request for some logical range (e.g., LBA range) of blocks to be retrieved from flash 150. Each client write command will constitute a request to store some logical range of blocks to the flash, and will be accompanied by a transfer of the associated writeback data from the client to the storage device.

The front end 202 processes these and other commands and arranges the respective read and write commands into one or more of the command queues 214 pending execution. The writeback data are stored in the write cache 204 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME 170, which in turn directs the same to the flash 150. As noted above, the FME 170 is a rudimentary front end on each die or set of dies and serves to direct commands and data to the local read/write/erase circuitry of the respective planes. In the case of a write command, the writeback data are written to the next set of available pages 160 in an allocated GCU 164 (FIG. 3). In the case of a read command, the data are retrieved, subjected to error correction and other signal processing steps, and placed in the read buffer. The map metadata are accessed and updated as required during these operations.

Client read commands tend to receive priority over other commands, including client write commands and background commands, on the basis that the client is likely waiting for the requested readback data before it can proceed with subsequent processing steps. At the same time, the command scheduler function of the controller needs to execute the background operations (e.g., garbage collection, map updates, calibrations, etc.) at a sufficient rate to enable the storage device to continue to service the client access commands at acceptable performance levels. Another complicating factor is that the various competing pending commands and background operations may require the use of shared resources that have to be made available before the next command can be carried out. These resources can include data buffers, decoders, encryption/decryption circuitry, lanes, dies, registers, map data, etc.

Continuing with FIG. 5, the front end 202 provides various statuses to the client, including command complete statuses when commands are completed. For completed read commands, the command complete status may indicate that the requested readback data have been successfully retrieved and are now available for transfer from the read buffer 206. If writeback caching techniques are employed, the front end 202 may proceed to issue a write command complete status to the client, even if the writeback data are still pending in the write cache 204 and have not yet been written to the flash 150. To this end, the write cache 204 may take the form of NVM, such as NAND or NOR flash, although such is not necessarily required. The read cache 206 may normally be volatile memory, such as DRAM, since the readback data in the read cache can always be re-read from the non-volatile flash if required. In some cases, data blocks may be internally transferred between the write cache 204 and the read buffer 206, as indicated by internal data path 216.

Figure 6:
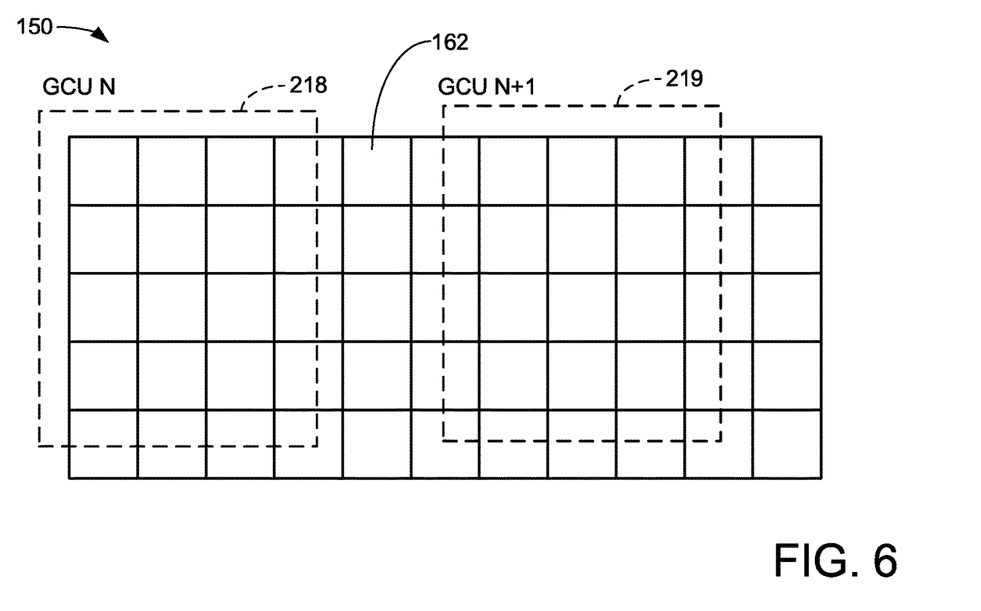
FIG. 6 shows different GCUs (garbage collection units) that can be arranged within the flash memory of the device of FIG. 2.

FIG. 6 shows different arrangements of GCUs in the flash memory 150 of FIG. 5. GCU N 218 incorporates a first set of erasure blocks 162 across various dies 154 of the flash memory 150. GCU N+1 219 incorporates a different, second set of erasure blocks 162 across various dies 154 of the flash memory 150. In one embodiment, each GCU has 32 erasure blocks on 32 different dies, but other arrangements can be used. The prefetched data can be from the same GCU, or from a different GCU that utilizes the same or similar resources. Multiple GCUs can be allocated and available for the storage of data at the same time.

Figure 7:
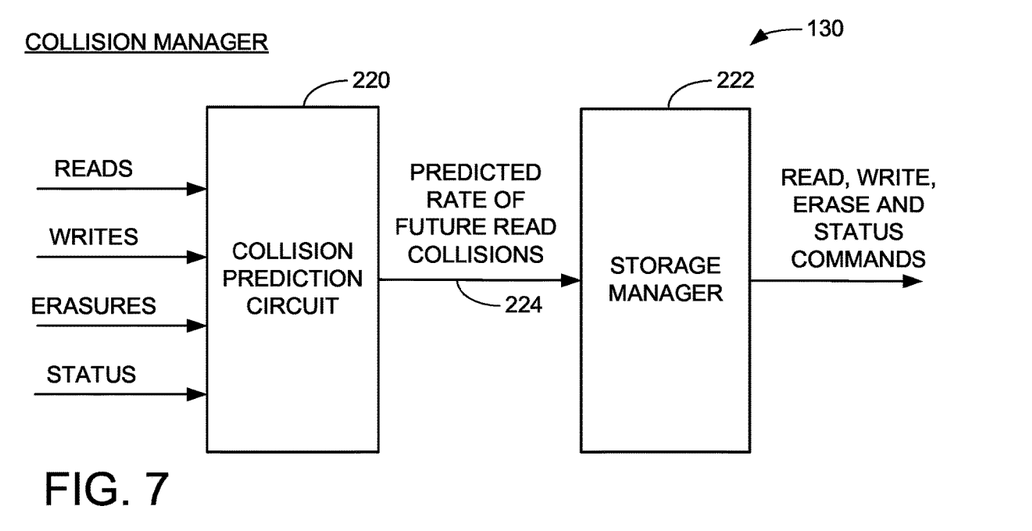
FIG. 7 depicts a collision manager circuit of the SSD in some embodiments.

FIG. 7 shows the collision manager 130 from FIG. 2 in greater detail. The collision manger 130 includes a collision prediction circuit 220 which operates to monitor various host and internally generated commands including reads, writes, erasures and status commands, as well as other parameters such as recent host history, etc. In response, the collision prediction circuit 220 provides information in the form of a predicted rate of future read collisions (via path 222) to a storage manager 224. The storage manager 224 operates to direct the execution of various commands based at least in part on the information supplied by the collision prediction circuit 222.

Figure 8:
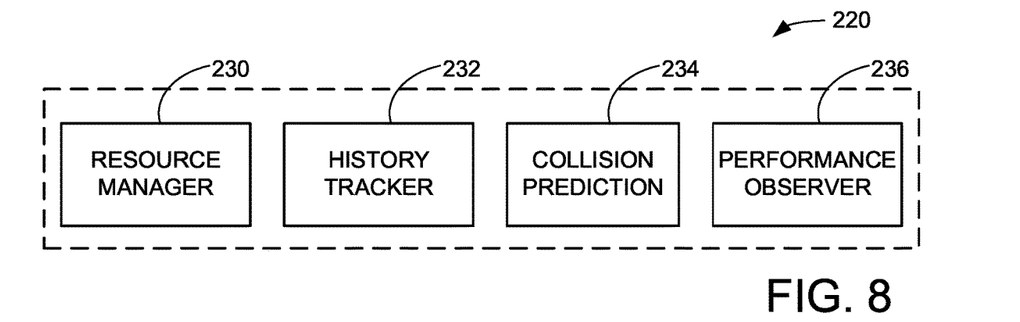
FIG. 8 illustrates aspects of the collision manager circuit of FIG. 7 in some embodiments.

FIG. 8 shows the collision prediction circuit 220 from FIG. 7 in greater detail. Other arrangements can be used so that the illustrated configuration is merely exemplary and is not limiting. The collision prediction circuit 220 includes a resource manager 230, which tracks the various resources required for each of the pending queued commands. The resource manager can be limited to tracking a subset of such commands, such as host commands, all read commands (whether host or background), all host read commands, etc.

A history tracker 232 operates to examine and track history data regarding recent host activity. This can include predictions of future read commands not yet received from the host based on previous behavior. History data may be accumulated and stored as a data structure in local memory as part of this operation.

A read collision prediction circuit 234 operates to predict future read collisions based on the outputs from the history tracker 232 and the resource manager 230. While it is expected that some read collisions will occur, the level and amount of such can be managed and, in many cases, maintained at an acceptable level. In some cases, statistics can be maintained based on which collisions will occur in the near future (including potential collisions on reads that have not yet been received and queued). A predetermined threshold can be established and used to adjudge the current risk of future read collisions. The collisions can be calculated in any number of suitable ways, such as a total number expected over a selected period of time (e.g., X possible collisions over the next Y minutes), a total percentage of read commands (e.g., for N pending host read commands, some percentage Z may experience collisions), and so on.

Finally, a performance observer 236 can be used to evaluate the effectiveness of the collision mitigation effort, allowing further adjustments to be adaptively made to continue to reduce the overall rate of collisions experienced by the system.

Figure 9:
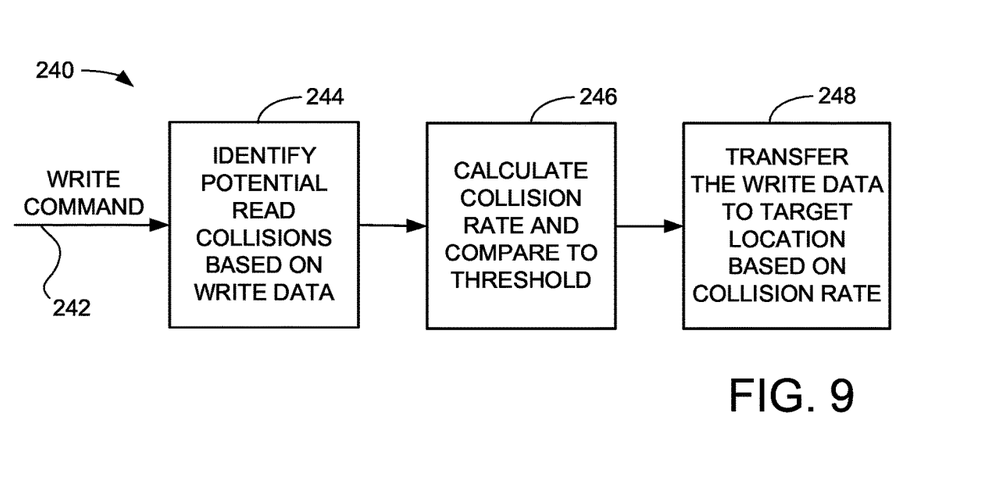
FIG. 9 illustrates operation of the collision manager circuit in some embodiments.

FIG. 9 is a sequence diagram 240 to illustrate operation of the collision manager 130 of FIGS. 7-8. For each write command queued for writing, as indicated by path 242, potential read collisions based on the associated write data are identified at block 244. From this, a collision rate may be calculated (including additional collisions from other sets of data stored to the flash memory), as indicated at block 246. At block 248, the write data are written to a selected location in the flash memory 150 based on the predicted collision rate. In some cases, the write data may be written to a first GCU, such as the GCU N (218) in FIG. 6; in other cases, the write data may be written to a different, second GCU, such as the GCU N+1 (219) in FIG. 6. Should these GCUs require different, non-overlapping resources, the writing of the data to a respective one of these GCUs may enable fewer read collisions in the near future involving the write data from the selected write command on path 242.

Figure 10:
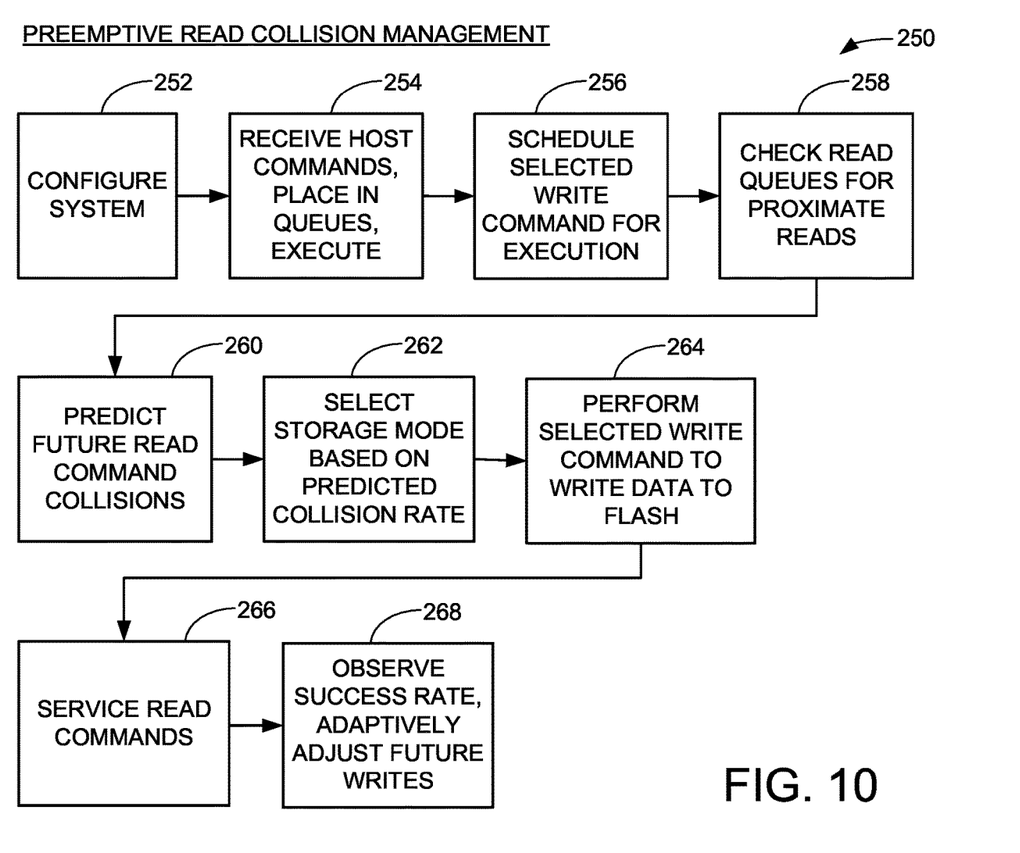
FIG. 10 is a sequence diagram to demonstrate preemptive collision management by the SSD in some embodiments.

FIG. 10 shows a sequence diagram 250 for preemptive read collision management carried out by the SSD 110 of FIG. 2 in accordance with some embodiments. This routine sets forth an exemplary sequence in accordance with the foregoing discussion. Other steps can be carried out so this is merely exemplary and is not limiting.

Block 252 shows an initial configuration of the system. This can include but is not limited to an initialization sequence for the system during which the SSD is powered up and transitioned to a normal mode of operation. Block 254 shows that various host commands are received and placed into one or more command queues pending operation. It will be appreciated that during continued operation addition background commands will additionally be generated and placed into various queues.

At such time that a write command is selected for execution to write data to the main memory (e.g., flash 150), as shown by block 256 the command is prepared for execution. This may include the combination of multiple data blocks, the encoding of the blocks, the generation of map data, the compression and encryption of the write data, and so on. The data are arranged into suitable data blocks (such as map units) and forwarded to the FME 170 for writing.

Concurrent with this operation, an operation takes place at block 258 to check the existing queues for read commands identifying data that are physically proximate the data to be written, on the basis of similar system resources. This operation can also examine the history data to evaluate the likelihood of future reads for the write data, etc.

Block 260 predicts a future read command collision rate in the manner discussed above, and ascertains whether this rate is relatively high or low. This can be carried out using a predetermined threshold or other factors. It will be noted that this query examines the potential for read command collisions per se, as well as the potential for read command collisions involving the write data associated with the selected write command.

Block 262 shows the selection of a particular storage mode based on the predicted collision rate. If the rate is low, the storage manager 222 (FIG. 7) may operate to store the data in a normal mode, that is, in a next available storage location currently being allocated for storage of the data. For example, if a particular GCU currently stores a previous copy of the write data (e.g., previous version LBAs, etc.), the new data may be written to the same GCU, or to another GCU that uses the same resource set (e.g., same die/channel combination, etc.). This will simplify and enhance the ability to access the metadata necessary to locate the most current version of the data.

On the other hand, if the potential for future read collisions appears to be high, the storage manager may transition to a distributed mode, that is, a different target location may be selected for the storage of the data that uses a different set of system resources (e.g., different die/channel set, etc.). Once the selected target location is identified, the write operation is performed at block 264 to write the data to the selected target location. Other steps are carried out as well, such as the updating of the map metadata, etc.

Block 266 shows the subsequent execution of various read commands, which may include read commands to read the data written at block 264. Block 268 shows the operation of the observer features of the collision manager 130 to observe and track the rate at which collisions occur (or are avoided) as a result of the storage location for the write data. As required, system parameters may be changed, such as a new, different threshold, a different manner in which read collision rates are evaluated, a different way to predict future read commands, and so on. In this way, an adaptive closed-loop approach is utilized to reduce actual host read collisions to an acceptable level.

Figure 11:
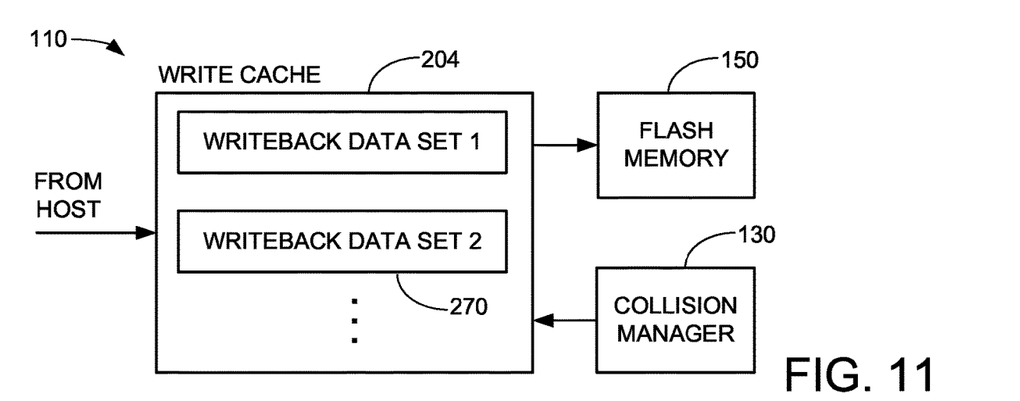
FIG. 11 shows aspects of the write cache during operation of the sequence of FIG. 10 in some embodiments.

FIG. 11 shows aspects of the write cache 204 of the SSD 110 during operation of the routine of FIG. 10. Different writeback data sets 270 are accumulated for writing to the flash memory 150. Two such data sets are identified as writeback data sets 1 and 2. In at least some embodiments, for each writeback data set, the collision manager 130 operates to calculate a predicted future host read collision rate for each of the writeback data sets, and to identify appropriate target locations in the flash memory, such as different GCUs that use different resource sets, in order to reduce such collisions.

While various embodiments have contemplated operation in the context of an SSD, this is merely for purposes of illustration and not limiting. Other forms of processing devices, including but not limited to hard disc drives (HDDs), hybrid drives, tape drives, etc. can also incorporate the various embodiments presented herein.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a non-volatile memory (NVM);
a host command queue that lists pending host read and host write commands to transfer data between the NVM and a host;
a write cache which temporarily stores write data sets pending transfer to the NVM responsive to execution of the associated host write commands in the host command queue;
a collision prediction circuit configured to predict a rate of future collisions between the pending host read commands in the host command queue, the collision prediction circuit comprising a resource manager configured to identify resources required for each of the sets of writeback data in the write queue, a history tracker that maintains, as a data structure in a memory, history data associated with recent host commands, a predictor circuit that generates an estimated read collision rate responsive to the resource manager and the history tracker, and an observer circuit which subsequently examines a rate at which read collisions occur during subsequent accesses of the sets of writeback data written to the NVM; and
a storage manager configured to operate in a first mode to direct storage of the write data sets from the write cache to a first target location responsive to the rate of future collisions being at a first level, and to operation in a second mode to direct storage of the write data sets from the write cache to a different, second target location responsive to the rate of future collisions being at a different, second level.

2. The apparatus of claim 1, wherein the rate of future collisions is based on history data from previous commands issued by the host.

3. The apparatus of claim 1, wherein the rate of future collisions is based on predicted requests, in the future, for the write data sets.

4. The apparatus of claim 1, wherein the rate of future collisions is further based on pending background read requests in a background command queue.

5. The apparatus of claim 1, wherein the NVM is divided into a plurality of garbage collection units (GCUs), each separately allocated and erased as a unit.

6. The apparatus with claim 5, wherein the first target location in the NVM comprises a first GCU and the second target location in the NVM comprises a second GCU, the first and second GCUs arranged on different combinations of semiconductor dies and corresponding channels.

7. The apparatus of claim 1, wherein the NVM comprises a NAND flash memory of a solid-state drive (SSD).

8. The apparatus of claim 1, wherein the NVM comprises a rotatable data recording medium.

9. The apparatus of claim 1, wherein only a single set of each set of writeback data are written to the NVM.

10. A solid-state drive (SSD), comprising:
a flash memory arranged as a main memory store for a host device;
a controller circuit configured to manage data transfers between the flash memory and the host device, the controller circuit configured to manage a host command queue that lists pending host read commands and host write commands to transfer data between the flash memory and the host device, and a non-volatile write cache which temporarily stores write data sets pending transfer to the flash memory responsive to execution of the associated host write commands in the host command queue;

a collision prediction circuit configured to predict a rate of future collisions between the pending host read commands in the host command queue; and a storage manager circuit configured to operate in a first mode to direct storage of a selected write data set from the write cache to a first target location responsive to the rate of future collisions being at a low first level, and to operation in a second mode to direct storage of the selected write data set from the write cache to a different, second target location responsive to the rate of future collisions being at a high second level, the first target location currently storing a previous version of the selected write data set and utilizing a first set of resources, the second target location not currently storing a previous version of the selected write data set and utilizing a different, second set of resources.

11. The SSD of claim 10, wherein the rate of future collisions is based on history data from previous host read commands and host write commands issued by the host.

12. The SSD of claim 10, wherein the rate of future collisions is based on predicted requests, in the near future, for the write data sets in the write cache.

13. The SSD of claim 10, wherein the rate of future collisions is based on pending background read requests in a background command queue managed by the controller circuit.

14. The SSD of claim 10, wherein the collision prediction circuit comprises a resource manager configured to identify resources required for each of the sets of writeback data in the write queue, a history tracker that maintains, as a data structure in a memory, history data associated with recent host commands, a predictor circuit that generates an estimated read collision rate responsive to the resources identified by the resource manager and the history data accumulated by the history tracker, and an observer circuit which subsequently examines a rate at which read collisions occur during subsequent accesses of the sets of writeback data written to the NVM.

15. A method comprising:

accumulating pending host read commands and host write commands in a queue to transfer data between a non-volatile memory (NVM) and a host device, the NVM divided into a plurality of garbage collection units (GCUs) each separately allocated and erased as a unit;

temporarily storing, in a write cache, write data sets associated with the host write commands;

predicting a rate of future collisions between the pending host read commands in the host command queue; and directing the write data sets in the write cache to different first or second target locations in the NVM responsive to the predicted rate of future collisions, the first target location comprising a first GCU, the second target location comprising a second GCU, the first and second GCUs arranged on different combinations of semiconductor dies and corresponding channels.

16. The method of claim 15, wherein the directing step comprises operating a data storage device having the NVM in a first mode to direct storage of the write data sets from the write cache to the first target location responsive to the rate of future collisions being at a first level, and to operate the data storage device in a second mode to direct storage of the write data sets from the write cache to the second target location responsive to the rate of future collisions being at a different, second level.

17. The method of claim 15, wherein the rate of future collisions is based on at least a selected one of history data from previous host read commands and previous host write commands issued by the host, predicted requests in the future for the write data sets, or pending background read requests in a background command queue.

18. The method of claim 15, wherein the NVM comprises a NAND flash memory of a solid-state drive (SSD).

19. An apparatus comprising:

a non-volatile memory (NVM);

a host command queue that lists pending host read and host write commands to transfer data between the NVM and a host;

a write cache which temporarily stores write data sets pending transfer to the NVM responsive to execution of the associated host write commands in the host command queue;

a collision prediction circuit configured to predict a rate of future collisions between the pending host read commands in the host command queue; and a storage manager configured to operate in a first mode to direct storage of the write data sets from the write cache to a first target location responsive to the rate of future collisions being at a first level, and to operation in a second mode to direct storage of the write data sets from the write cache to a different, second target location responsive to the rate of future collisions being at a different, second level, the storage manager only writing a single set of each write data set to the NVM.

20. The apparatus of claim 19, wherein the NVM is divided into a plurality of garbage collection units (GCUs) each separately allocated and erased as a unit, the first target location in the NVM comprises a first GCU, the second target location in the NVM comprises a second GCU, and the first and second GCUs arranged on different combinations of semiconductor dies and corresponding channels of the NVM.

* * * * *